(12) United States Patent
Yamahara

(10) Patent No.: US 9,202,030 B2
(45) Date of Patent: Dec. 1, 2015

(54) INFORMATION PROCESSING SYSTEM, INFORMATION PROCESSING METHOD, INFORMATION PROCESSING DEVICE, PROGRAM AND STORAGE MEDIUM

(75) Inventor: Hisanori Yamahara, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 41 days.

(21) Appl. No.: 14/119,447

(22) PCT Filed: Jan. 30, 2012

(86) PCT No.: PCT/JP2012/052013
§ 371 (c)(1),
(2), (4) Date: Nov. 22, 2013

(87) PCT Pub. No.: WO2012/164970
PCT Pub. Date: Dec. 6, 2012

(65) Prior Publication Data
US 2014/0150117 A1    May 29, 2014

(30) Foreign Application Priority Data
May 31, 2011   (JP) ................. 2011-122968

(51) Int. Cl.
*H04L 29/06* (2006.01)
*G06F 21/31* (2013.01)

(52) U.S. Cl.
CPC .......... *G06F 21/31* (2013.01); *G06F 2221/032* (2013.01); *G06F 2221/2105* (2013.01); *G06F 2221/2123* (2013.01); *G06F 2221/2149* (2013.01)

(58) Field of Classification Search
CPC ....................................................... G06F 21/31
USPC ............................................................ 726/28
See application file for complete search history.

(56) References Cited

U.S. PATENT DOCUMENTS

| | | | | |
|---|---|---|---|---|
| 5,764,789 A | * | 6/1998 | Pare et al. | 382/115 |
| 2007/0250920 A1 | * | 10/2007 | Lindsay | 726/7 |
| 2009/0247123 A1 | * | 10/2009 | Lee et al. | 455/410 |

(Continued)

FOREIGN PATENT DOCUMENTS

| JP | 2002-358418 A | 12/2002 |
|---|---|---|
| JP | 2003-203139 A | 7/2003 |

(Continued)

OTHER PUBLICATIONS

The partial translation of Office Action for corresponding Japanese Patent Application No. 2011-122968 dated Jul. 29, 2014.

(Continued)

*Primary Examiner* — Michael S McNally
(74) *Attorney, Agent, or Firm* — Hubbs, Enatsky & Inoue PLLC

(57) ABSTRACT

To reduce a fear in that another person notices limitation of a range of information that forms a basis of a screen provided to a user, a page generation unit identifies a publicly-displayable range of information on the user based on control information, which is information different from a password and is identified based on content of an operation performed in a password input field with an input device. The page generation unit limits the range of the information that forms the basis of the screen provided to the user so that the range of the information falls within the publicly-displayable range identified by the page generation unit.

17 Claims, 7 Drawing Sheets

(56) References Cited

U.S. PATENT DOCUMENTS

| | | |
|---|---|---|
| 2010/0212002 A1 | 8/2010 | Michener et al. |
| 2012/0011577 A1* | 1/2012 | Mashimo ........................ 726/7 |

FOREIGN PATENT DOCUMENTS

| | | |
|---|---|---|
| JP | 2005-208763 A | 8/2005 |
| JP | 2009-545897 A | 12/2009 |
| JP | 2011-191850 A | 9/2011 |

OTHER PUBLICATIONS

International Search Report for PCT/JP2012/052013 dated Feb. 21, 2012.
English Translation of Written Opinion of the International Searching Authority for PCT/JP2012/052013 accompanied with PCT/IB/373 and PCT/IB/338 dated Dec. 12, 2013.

* cited by examiner

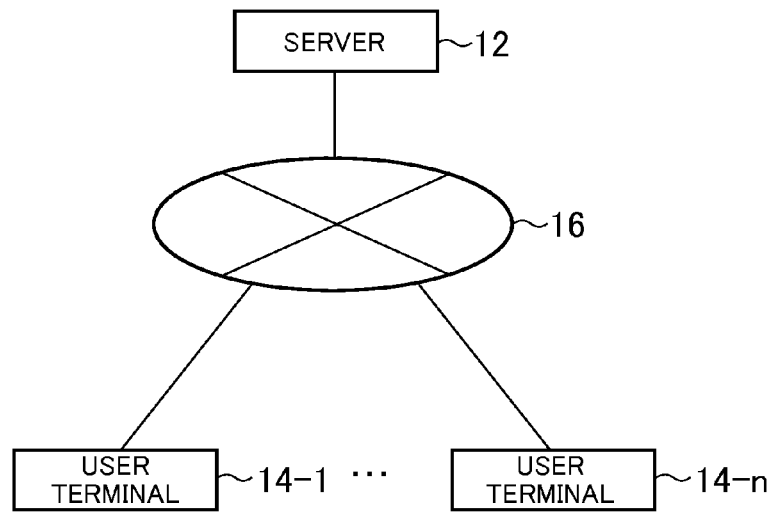
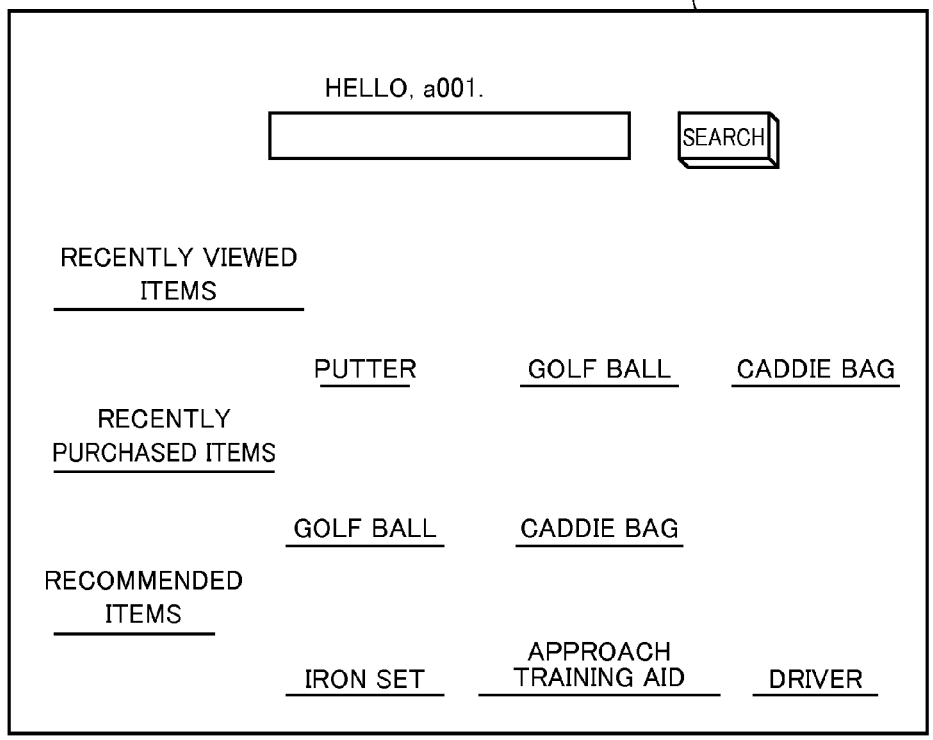

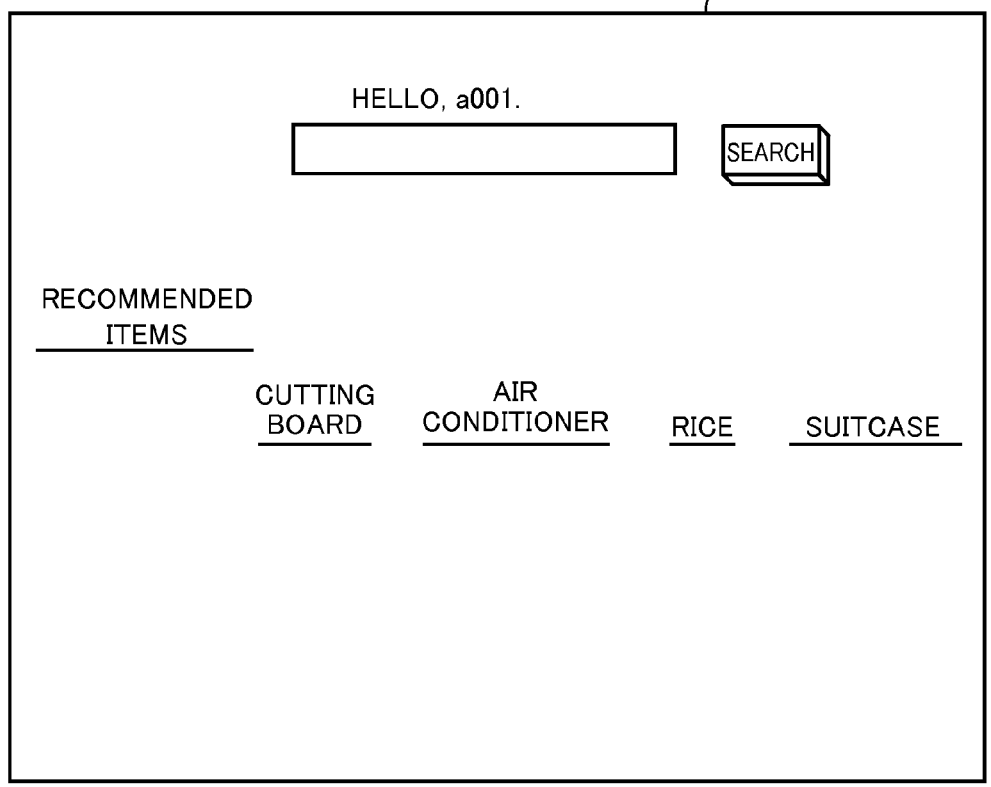

| USER ID | ITEM ID | PURCHASE DATE/ TIME INFORMATION |
|---------|---------|---------------------------------|
| a001 | 0001 | 05/01/2011 11:05:30 |
| a001 | 0002 | 05/01/2011 11:05:30 |

| USER ID | PASSWORD | NAME DATA | SEX DATA | AGE DATA | ADDRESS DATA | |
|---------|----------|-----------|----------|----------|--------------|---|
| a001 | a1b2c3 | · · · · | MALE | 50 | · · · · | |
| b012 | x4y5z6 | · · · · | FEMALE | 35 | · · · · | |
| | | | | | | |

| ITEM ID | ITEM NAME DATA | ITEM TYPE DATA | PRICE DATA | |
|---------|----------------|----------------|------------|---|
| 0001 | CADDIE BAG | GOLF GOODS | 12,000 YEN | |
| 0002 | GOLF BALL | GOLF GOODS | 700 YEN | |
| 0003 | PUTTER | GOLF GOODS | 10,000 YEN | |
| | | | | |

| SECRECY LEVEL SETTING ID | SETTING ATTRIBUTE DATA | SECRECY LEVEL DATA |
|---|---|---|
| 001 | ACCOUNT DATA/USER ID | 1 |
| 002 | ACCOUNT DATA/NAME | 2 |
| 003 | ACCOUNT DATA/SEX | 2 |
| 004 | ACCOUNT DATA/AGE | 2 |
| 005 | ACCOUNT DATA/ADDRESS | 3 |
| 006 | ACCESS HISTORY DATA/ALL | 4 |
| 007 | PURCHASE HISTORY DATA/ALL | 5 |
| | | |

[1]
INFORMATION PROCESSING SYSTEM, INFORMATION PROCESSING METHOD, INFORMATION PROCESSING DEVICE, PROGRAM AND STORAGE MEDIUM

CROSS REFERENCE TO RELATED APPLICATIONS

This application is a National Stage of International Application No. PCT/JP2012/052013 filed Jan. 30, 2012, claiming priority based on Japanese Patent Application No. 2011-122968 filed on May 31, 2011. The contents of each of the above documents are incorporated herein by reference in their entirety.

TECHNICAL FIELD

The present invention relates to an information processing system, an information processing method, an information processing device, a program, and a storage medium.

BACKGROUND ART

There are shopping sites, and others which are configured to provide screens that have been customized for each user depending on a purchase history, a browsing history, sex, age, and the like.

As a privacy protection technology for such web sites, Patent Literature 1 discloses an information processing device that evaluates whether information is utilized or its use is limited from the viewpoint of a secrecy property and the like of the information, and is capable of limiting the use of the information when it is judged that its use must be limited.

CITATION LIST

Patent Literature

Patent Literature 1: JP 2003-203139 A

SUMMARY OF INVENTION

Technical Problem

It is convenient if a range of information that forms the basis of a screen that has been customized for each user can be limited by the user. However, when an explicit operation is required to limit the range of the information that forms the basis of the customized screen, such explicit operation is easily noticed by another person. As a result, there is a fear in that the person may sense that the user has some information to hide.

The present invention has been made in view of the above-mentioned problem, and therefore has an object to reduce the fear in that another person notices the limitation of the range of the information that forms the basis of the screen provided to the user.

Solution to Problem

In order to solve the above-mentioned problem, according to one embodiment of the present invention, there is provided an information processing system including: control information identification means for identifying control information, which is information different from a password, based on content of an operation performed in a password input field with an input device; publicly-displayable range identification means for identifying a publicly-displayable range of information on a user based on the control information; and limiting means for limiting a range of information that forms a basis of a screen provided to the user so that the range of the information falls within the publicly-displayable range identified by the publicly-displayable range identification means.

Further, according to one embodiment of the present invention, there is provided an information processing method including: a control information identification step of identifying control information, which is information different from a password, based on content of an operation performed in a password input field with an input device; a publicly-displayable range identification step of identifying a publicly-displayable range of information on a user based on the control information; and a limiting step of limiting a range of information that forms a basis of a screen provided to the user so that the range of the information falls within the publicly-displayable range identified in the publicly-displayable range identification step.

Further, according to one embodiment of the present invention, there is provided an information processing device including: publicly-displayable range identification means for identifying a publicly-displayable range of information on a user based on control information, which is information different from a password and is identified based on content of an operation performed in a password input field with an input device; and limiting means for limiting a range of information that forms a basis of a screen provided to the user so that the range of the information falls within the publicly-displayable range identified by the publicly-displayable range identification means.

Further, according to one embodiment of the present invention, there is provided a program for causing a computer to function as: publicly-displayable range identification means for identifying a publicly-displayable range of information on a user based on control information, which is information different from a password and is identified based on content of an operation performed in a password input field with an input device; and limiting means for limiting a range of information that forms a basis of a screen provided to the user so that the range of the information falls within the publicly-displayable range identified by the publicly-displayable range identification means.

Further, according to one embodiment of the present invention, there is provided a storage medium having a program stored thereon, the program causing a computer to function as: publicly-displayable range identification means for identifying a publicly-displayable range of information on a user based on control information, which is information different from a password and is identified based on content of an operation performed in a password input field with an input device; and limiting means for limiting a range of information that forms a basis of a screen provided to the user so that the range of the information falls within the publicly-displayable range identified by the publicly-displayable range identification means.

According to the present invention, the control information is identified based on the content of the operation performed in the password input field with the input device. Then, the range of the information that forms the basis of the screen provided to the user is limited to the publicly-displayable range identified based on the control information. Therefore, according to the present invention, it is possible to reduce the fear in that another person notices the limitation of the range of the information that forms the basis of the screen provided to the user.

According to one aspect of the present invention, the publicly-displayable range identification means identifies at least one information element from among one or more information elements on the user, and the limiting means limits, to the identified at least one information element, the range of the information that forms the basis of the screen provided to the user.

Further, according to one aspect of the present invention, to each of the one or more information elements, a secrecy level representing a degree of secrecy of the information is set, the control information identification means identifies the secrecy level, and the publicly-displayable range identification means identifies an information element having set thereto a secrecy level representing secrecy that is lower than secrecy represented by the identified secrecy level.

Further, according to one aspect of the present invention, the limiting means limits a range of information displayed on the screen provided to the user.

Further, according to one aspect of the present invention, the information processing system further includes control means for controlling information included in the screen provided to the user so that alternative information is arranged instead of information limited to be excluded from the screen.

Further, according to one aspect of the present invention, when a condition that the password input to the input device includes a character string set in advance by the user is satisfied, the limiting means limits the range of the information that forms the basis of the screen.

Further, according to one aspect of the present invention, when any one of a plurality of passwords associated with different ranges of information is input to the input device, the limiting means limits the range of the information that forms the basis of the screen provided to the user so that the range of the information falls within a range of information associated with the any one of the plurality of passwords input to the input device.

Further, according to one aspect of the present invention, the plurality of passwords have the same number of characters.

Further, according to one aspect of the present invention, at least parts of keys used to input characters at the same positions from a top of the plurality of passwords match with each other.

Further, according to one aspect of the present invention, the control information identification means identifies the control information based on an input interval of characters included in the password or a time period calculated based on a time when an input of the password is enabled and a time when a character included in the password is input.

Further, according to one aspect of the present invention, the information processing system further includes authentication means for authenticating the user by using the password input to the input device, and the limiting means limits a range of information that forms a basis of a screen provided when the user is successfully authenticated by the authentication means so that the range of the information falls within the publicly-displayable range identified by the publicly-displayable range identification means.

BRIEF DESCRIPTION OF DRAWINGS

FIG. 1 is an overall configuration diagram of a computer network according to an embodiment of the present invention.

FIG. 2 is a diagram illustrating an example of a portal page in a private mode.

FIG. 3 is a diagram illustrating an example of a portal page in a public mode.

FIG. 4 is a diagram illustrating an example of access history data.

FIG. 7 is a diagram illustrating an example of account data.

FIG. 8 is a diagram illustrating an example of item master data.

FIG. 9 is a diagram illustrating an example of secrecy level setting data.

DESCRIPTION OF EMBODIMENTS

Figures 5, 6:
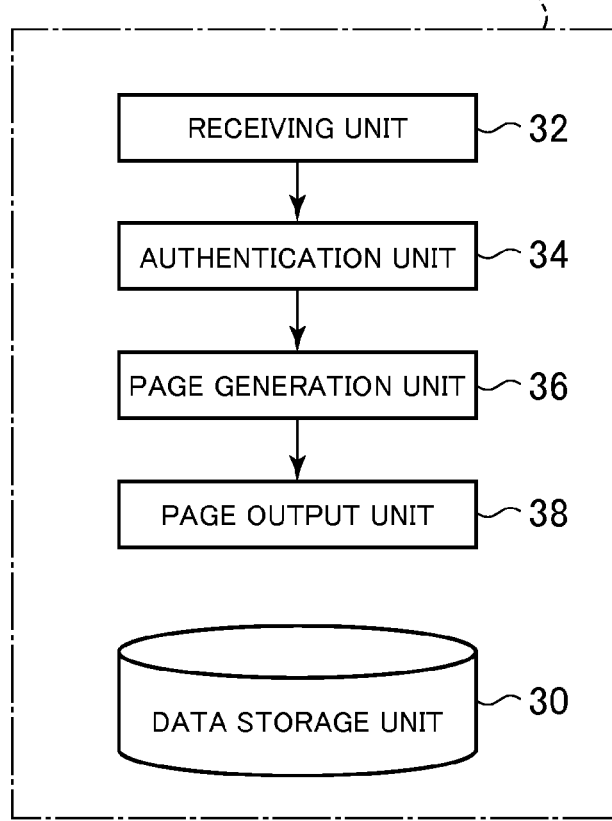
FIG. 5 is a diagram illustrating an example of purchase history data.
FIG. 6 is a functional block diagram illustrating an example of functions implemented by a server according to the embodiment of the present invention.

Hereinafter, an embodiment of the present invention is described in detail with reference to the drawings.

FIG. 1 is an overall configuration diagram of an information processing system 10 according to the embodiment of the present invention. As illustrated in FIG. 1, the information processing system 10 includes a server 12 and user terminals 14 (14-1 to 14-*n*), each of which is mainly constituted of a computer. The server 12 and each of the user terminals 14 are communicable to each other via a computer network 16 such as the Internet.

The server 12 according to this embodiment is an information processing device including a control unit, which is a program control device such as a central processing unit (CPU) and operates in accordance with programs installed in the server 12, a storage unit such as a memory element, for example, a read-only memory (ROM) and a random access memory (RAM), or a hard disk drive, and a communication unit, which is a communication interface such as a network board. Those elements are connected via a bus. The storage unit of the server 12 stores the programs to be executed by the control unit of the server 12. The storage unit of the server 12 also operates as a work memory of the server 12. The server 12 according to this embodiment is capable of using a web technology to provide to a user a service such as a shopping site on which an item or service can be purchased online.

The user terminal 14 is, for example, an information processing device such as a personal computer, a mobile phone, a personal digital assistant (PDA), and a smart phone. The user terminal 14 includes, for example, a control unit such as a CPU, a storage unit such as a memory element, for example, a ROM and a RAM, and a hard disk drive, an output unit such as a display, an input unit such as a mouse, a keyboard, a touch pad, and a button, and a communication unit such as a network board. In addition, in the user terminal 14 according to this embodiment, a web browser is preinstalled, and a program of the web browser is executed. The user terminal 14 receives the service provided by the server 12 through the web browser.

In this embodiment, when the user terminal 14 accesses a web page placed in the server 12 through the web browser, the web page is displayed on the display of the user terminal 14. In addition, after the server 12 executes authentication processing of the user, the server 12 may determine an identifier (user ID) of the user who uses the user terminal 14.

In this embodiment, a login page (not shown), which is provided by the server 12 according to this embodiment and in which a user ID input field, a password input field, and a login button are arranged, is displayed on the display of the user terminal 14 via the web browser. Then, the user clicks on the user ID input field or performs other such operation to achieve a state in which a prompt is displayed in the user ID input field, and then uses an input device such as the keyboard to input the user ID to the user ID input field. Then, the user clicks on the password input field or performs other such operation to achieve a state in which a prompt is displayed in the password input field, and then uses the input device such as the keyboard to input a password to the password input field. Then, when the user clicks on the login button, the input user ID and password are transmitted to the server 12. Then, the server 12 executes the authentication processing based on the user ID and the password, which are transmitted from the user terminal 14. Then, when the authentication is successful, the server 12 generates a portal page of the shopping site (in this embodiment, a portal page 20 in a private mode illustrated in FIG. 2 or a portal page 22 in a public mode illustrated in FIG. 3) depending on an input mode of the password received from the user terminal 14, and transmits the portal page to the user terminal 14. Then, the user terminal 14 outputs the received page for display on the display via the web browser.

Moreover, in this embodiment, when the user accesses a page introducing an item or service sold on the shopping site, the server 12 generates access history data 24 exemplified in FIG. 4, which includes the user ID of the user who accesses the page, an identifier (item ID) of the item or service introduced in the page, access date/time information indicating the date and time the page is accessed, and the like, and stores the access history data 24 in the storage unit included in the server 12. Moreover, when the user purchases an item or service sold on the shopping site, the server 12 generates purchase history data 26 exemplified in FIG. 5, which includes the user ID of the user who purchases the item or service, the item ID of the item or service, information indicating a purchase date and time of the item or service, and the like, and stores the purchase history data 26 in the storage unit included in the server 12.

FIG. 6 is a functional block diagram illustrating an example of functions implemented by the server 12 according to this embodiment. The server 12 according to this embodiment functionally includes a data storage unit 30, a receiving unit 32, an authentication unit 34, a page generation unit 36, and a page output unit 38. The data storage unit 30 is mainly implemented by the storage unit of the server 12. The receiving unit 32 and the page output unit 38 are mainly implemented by the control unit and the communication unit of the server 12. The other elements are mainly implemented by the control unit of the server 12.

Those elements are implemented by executing the programs installed in the server 12, which is a computer, by the control unit of the server 12. Note that, the programs are supplied to the server 12 via, for example, a computer readable storage medium such as a compact disc (CD)-ROM and a digital versatile disc (DVD)-ROM, or via a communication network such as the Internet.

Note that, the server 12 according to this embodiment also implements functions (for example, functions regarding online shopping) other than those illustrated in FIG. 6.

In this embodiment, the data storage unit 30 stores in advance the access history data 24 and the purchase history data 26 described above, account data 40 exemplified in FIG. 7, item master data 42 exemplified in FIG. 8, secrecy level setting data 44 exemplified in FIG. 9, and the like.

The account data 40 is data for managing users who use the shopping site, and includes, for example, the identifier (user ID) of the user, the password set by the user, and data representing attributes of the user such as name data representing the name of the user, sex data indicating the sex, age data indicating the age, and address data indicating the address.

The item master data 42 is data for managing items or services sold on the shopping site implemented by the server 12, and includes, for example, the item ID which is the identifier of the sold item or service, item name data indicating the name of the item or service, item type data indicating the type of the item or service, price data indicating the price of the item or service, and the like.

The secrecy level setting data 44 is data for managing settings on secrecy of elements on the user, such as an access history of the user, a purchase history of the user, and attributes of the user, and includes, for example, a secrecy level setting ID, which is an identifier of the secrecy level setting data 44, setting attribute data indicating data to which a secrecy level is set and attributes of the data to which the secrecy level is set, and secrecy level data indicating the secrecy level representing a degree of secrecy. In this embodiment, the secrecy level is represented by any integer of from 1 to 5, and as the number becomes larger, secrecy becomes higher.

A value of the secrecy level data may be arbitrarily set by the user. Alternatively, the value of the secrecy level data may be set based on the secrecy level set in advance to each item type, and the type of an item or service introduced in a page newly browsed by the user.

Moreover, a correspondence relationship between a combination of the item type, an attribute of the user, and the value of the secrecy level data may be set in advance. Then, the value of the secrecy level data may be set based on the type of the item or service introduced in the page newly browsed by the user and the attribute of the user. For example, it is assumed that item types of items introduced in a page browsed by the user are "cosmetics", "men's shoes", and "drinking water". In this case, when the sex of the user who browses the page is "male", values of the secrecy level data may be set in a descending order of "cosmetics", "drinking water", and "men's shoes", and when the sex of the user who browses the page is "female", the values of the secrecy level data may be set in a descending order of "men's shoes", "drinking water", and "cosmetics".

Moreover, for example, when the user browses a new page, an item or the like that is the same as or related to the item or the like introduced in the page may be determined. Then, the value of the secrecy level data set to the determined item or the like by the user before the new page is browsed may be set as a value of the secrecy level data of the item or the like introduced in the new page browsed by the user.

In this embodiment, a value of "4" is set as the value of the secrecy level data for all the attributes of the access history data 24, and a value of "5" is set as the value of the secrecy level data for all the attributes of the purchase history data 26. Moreover, for the attributes included in the account data 40, as the values of the secrecy level data, a value of "1" is set to the user ID, a value of "2" is set to the name data, the sex data, and the age data, and a value of "3" is set to the address data.

Figure 10:
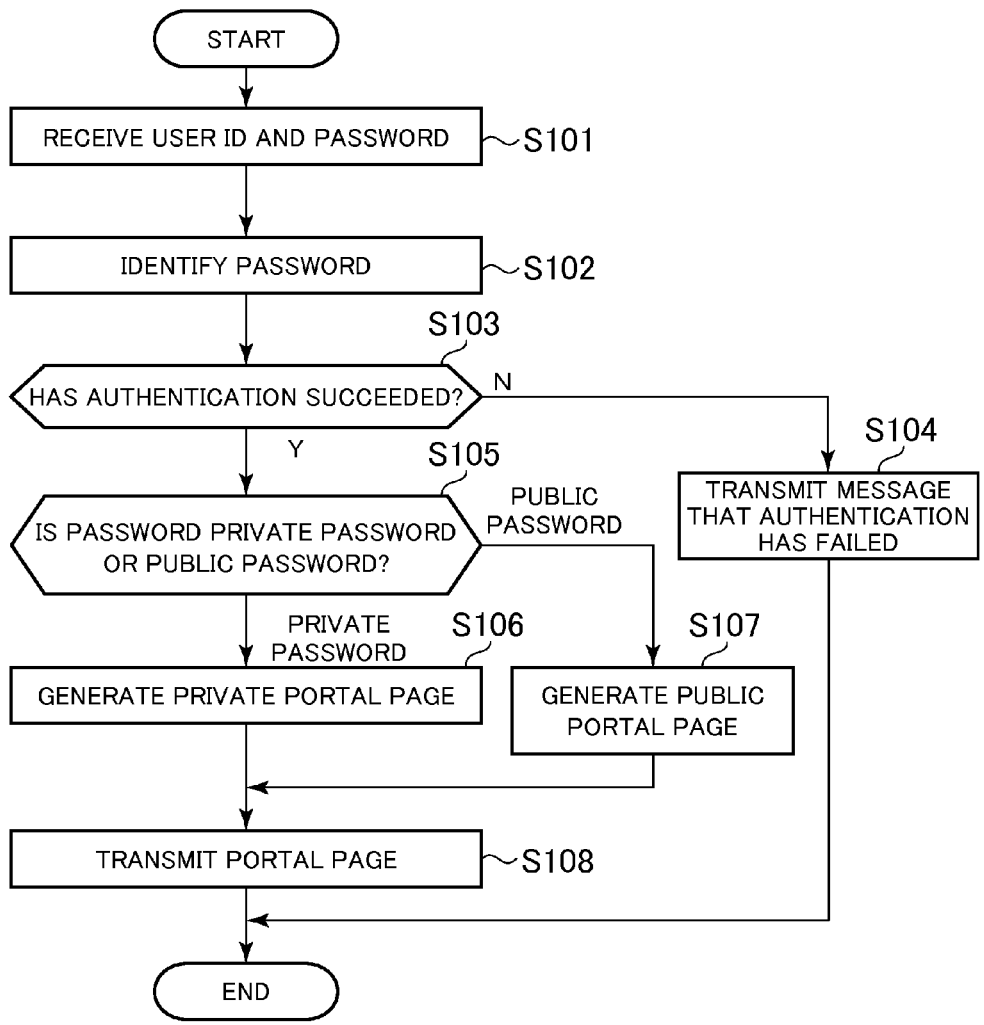
FIG. 10 is a flowchart illustrating an example of a flow of processing performed by the server according to the embodiment of the present invention.

Now, an example of a flow of processing performed by the server 12 according to this embodiment is described with reference to a flowchart illustrated in FIG. 10.

First, the receiving unit 32 receives from the user terminal 14 a user ID and a password, which are input to the login page by the user (S101). Then, the authentication unit 34 identifies a password associated with the user ID, which is received in the processing denoted by S101, in the account data 40 stored in the data storage unit 30 (S102).

The authentication unit 34 judges whether the authentication has succeeded or failed (S103). In this embodiment, the authentication unit 34 judges that the authentication has succeeded when the password received in the processing denoted by S101 is any one of a character string obtained by prefixing or suffixing "1" to the password identified in the processing denoted by S102, a character string obtained by prefixing or suffixing "0" to the password identified in the processing denoted by S102, and a character string of the password identified in the processing denoted by S102 itself, and judges that the authentication has failed otherwise. Hereinafter, the character string obtained by prefixing or suffixing "1" to the password identified in the processing denoted by S102 is referred to as a private password, and the character string obtained by prefixing or suffixing "0" to the password identified in the processing denoted by S102 or the character string of the password identified in the processing denoted by S102 itself is referred to as a public password.

Then, when it is judged in the processing denoted by S103 that the authentication has failed (S103: N), the authentication unit 34 transmits to the user terminal 14 a message that the authentication has failed (S104), and the processing illustrated in this processing example ends. In this case, the user terminal 14 outputs, for example, a login page including the message that the authentication has failed for display on the display via the web browser.

On the other hand, when it is judged in the processing denoted by S103 that the authentication has succeeded (S103: Y), the authentication unit 34 judges whether the password received in the processing denoted by S101 is the private password or the public password (S105). Then, when the password is the private password, the page generation unit 36 generates the portal page 20 in the private mode illustrated in FIG. 2 (S106) based on the attributes included in the account data 40, the access history data 24, and the purchase history data 26 associated with the user ID received in the processing denoted by S101.

On the other hand, when the password is the public password, the page generation unit 36 identifies information having the value of the set secrecy level data equal to or lower than a predetermined threshold (in this processing example, "3") from among the attributes included in the account data 40, the access history data 24, and the purchase history data 26 associated with the user ID received in the processing denoted by S101, and generates the portal page 22 in the public mode illustrated in FIG. 3 based on the identified information (S107). As described above, in this processing example, data on a user A on the basis of which the portal page 20 in the private mode is generated is not limited, but data on the user A on the basis of which the portal page 22 in the public mode is generated is limited to information having set thereto a secrecy level representing secrecy that is lower than secrecy determined based on the type of the password input by the user.

Then, the page output unit 38 transmits to the user terminal 14 the portal page generated in the processing denoted by S106 or S107 (S108), and the processing illustrated in this processing example ends. When the user terminal 14 receives the portal page transmitted in the processing denoted by S108, the user terminal 14 outputs the received portal page for display on the display.

For example, when a user (hereinafter referred to as user A) having a user ID of "a001" inputs a password "a1b2c31" in the login page, the password is a character string obtained by suffixing "1" to the password "a1b2c3" set in the account data 40, and hence the authentication unit 34 judges the input password to be the private password. As a result, in response to the input of the password, the page generation unit 36 generates the portal page 20 in the private mode exemplified in FIG. 2. As described above, the data on the user A on the basis of which the portal page 20 in the private mode is generated is not limited.

In this embodiment, in the portal page 20 in the private mode, links to pages introducing items or services identified by item IDs associated with the user ID of the user A in the access history data 24 are arranged in a region showing "Recently Viewed Items". Also in the portal page 20 in the private mode, links to pages introducing the items or services identified by the item IDs associated with the user ID of the user A in the purchase history data 26 are arranged in a region showing "Recently Purchased Items". Also in the portal page 20 in the private mode, links to pages introducing items or services recommended to the user A are arranged in a region showing "Recommended Items". The items or services recommended to the user A are determined here based on the item IDs associated with the user ID of the user A in the access history data 24 and the purchase history data 26 in this embodiment. In the region showing "Recommended Items", for example, links to pages introducing items or services which are of the same item type but have not been purchased by the user A are arranged. In this embodiment, as illustrated in FIG. 2, in the portal page 20 in the private mode, links to pages introducing items of the item type: "Golf Goods" are arranged.

On the other hand, when the user A inputs a password "a1b2c30" in the login page, the password is a character string obtained by suffixing "0" to the password "a1b2c3" set in the account data 40, and hence the authentication unit 34 judges the input password to be the public password. As a result, in response to the input of the password, the page generation unit 36 generates the portal page 22 in the public mode exemplified in FIG. 3. As described above, the data on the user A on the basis of which the portal page 22 in the public mode is generated is limited to the information having the value of the secrecy level data equal to or lower than "3". Then, in this embodiment, in the portal page 22 in the public mode, the region showing "Recently Viewed Items" and the region showing "Recently Purchased Items" are not present. Also in the portal page 22 in the public mode, in the region showing "Recommended Items", for example, links to pages introducing items or services determined irrespective of a purchase history and an access history of the user A (for example, best-selling item group or service group within the last one week) are arranged. Note that, for example, in the portal page 22 in the public mode, information arranged in the region showing "Recently Viewed Items" and the region showing "Recently Purchased Items" may be set as hidden data. In other words, the information arranged in the region showing "Recently Viewed Items" and the region showing "Recently Purchased Items" may be transmitted from the server 12 to the user terminal 14 but not displayed on the user terminal 14. Specifically, for example, the information arranged in the region showing "Recently Viewed Items" and the region showing "Recently Purchased Items" in the portal page 22 in the public mode may be enclosed by the tags <div style="visibility:hidden"> and </div>.

As described above, in this embodiment, depending on the password input by the user A, information on the user A arranged in the portal page (for example, personal information) and information on the user A that forms the basis of the information arranged in the portal page (for example, personal information) are determined. Moreover, in the case where the public password is input, the range of the information displayed as the portal page and the range of the information that forms the basis of the information included in the portal page are limited narrower than in the case where the private password is input.

As described above, in this embodiment, based on content of an operation performed in the password input field by the user with the input device in a state in which the password input field is activated (for example, state in which the prompt is displayed), control information (in the above-mentioned example, secrecy level) that is different from the password is identified. Then, based on the control information, a publicly-displayable range of the information on the user is identified. Then, the range of the information on the basis of which the portal page is generated is limited to the identified publicly-displayable range. Therefore, it is possible to reduce the fear in that another person notices the limitation of the range of the information that forms the basis of the screen provided to the user. In particular, a form for inputting the password in the login page displays the input character string as hidden characters, and hence even in a situation where another person peeks in while the user is inputting the password in the login page, it is expected that there is a low risk in that the person finds the user controlling the range of the information on the basis of which the portal page is generated. Moreover, in this embodiment, the password input when the portal page 20 in the private mode is displayed and the password input when the portal page 22 in the public mode is displayed have the same number of characters, and hence it is expected that there is an even lower risk in that another person finds the user controlling the range of the information on the basis of which the portal page is generated. Note that, the control information described above does not need to be the secrecy level.

Note that, the present invention is not limited to the embodiment described above.

For example, the page generation unit 36 may generate the portal page 20 in the private mode when the password included in the account data 40 and the password input by the user completely match as case-insensitive character strings and when characters in the character strings also completely match case-sensitively, and may generate the portal page 22 in the public mode when the password included in the account data 40 and the password input by the user completely match as the case-insensitive character strings and do not completely match case-sensitively. Specifically, for example, when "a1b2c3" is input as the password, the page generation unit 36 generates the portal page 20 in the private mode, and when key inputs of the shift key plus "a", the shift key plus "b", and the shift key plus "c" are made instead of the key inputs of "a", "b", and "c" to input "A1B2C3" as the password, the page generation unit 36 may generate the portal page 22 in the public mode. In this manner, a relationship may be established between the password input to generate the portal page 20 in the private mode and the password input to generate the portal page 22 in the public mode that at least parts of the keys used to input characters at the same positions from the top match with each other.

Moreover, for example, in the account data 40, two passwords (for example, first password and second password) may be set to one user. Then, when the first password is input by the user, the page generation unit 36 may generate the portal page 20 in the private mode, and when the second password is input by the user, the page generation unit 36 may generate the portal page 22 in the public mode.

Figure 11:
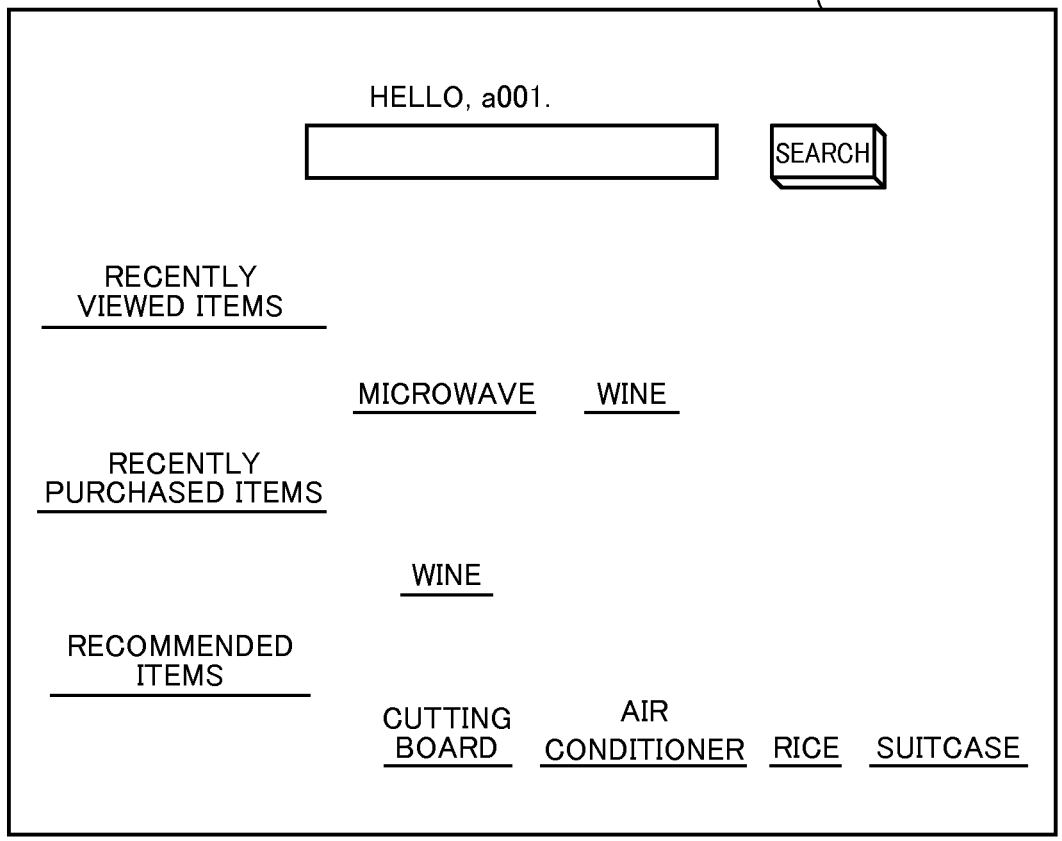
FIG. 11 is a diagram illustrating another example of the portal page in the public mode.

Moreover, as exemplified in FIG. 11, when the page generation unit 36 generates the portal page 22 in the public mode, alternative information may be arranged in the region showing "Recently Viewed Items" and the region showing "Recently Purchased Items". The page generation unit 36 may arrange in the regions, for example, information on predetermined dummy items or services or the like instead of the information limited to be excluded from the portal page.

Moreover, for example, the secrecy level may be set in association with a combination of an attribute of an item (for example, item type or the like) and an attribute of the user (for example, sex or the like). Specifically, for example, to a combination of an item type: "women's bag" and the sex: "male", "5" may be set as the value of the secrecy level. Then, in this case, when the value of the sex data included in the account data 40 of the user who has logged in is "male" and the purchase history data 26 of the user includes an item ID corresponding to a women's bag, a link introducing the item may not be arranged in the portal page 22 in the public mode.

Moreover, for example, the page generation unit 36 may determine, based on an input interval of characters included in the password or a time period calculated based on a time when an input of the password is enabled and a time when a character included in the password is input, whether to generate the portal page 20 in the private mode or the portal page 22 in the public mode. Specifically, for example, when a time period from a time when the first character of the password is input to a time when the login button is clicked on is longer than a predetermined time period, the page generation unit 36 may generate the portal page 20 in the private mode, otherwise the page generation unit 36 may generate the portal page 22 in the public mode. Moreover, for example, when a time period from the time when the first character of the password is input to a time when the last character in the password is input is longer than a predetermined time period, the page generation unit 36 may generate the portal page 20 in the private mode, otherwise the page generation unit 36 may generate the portal page 22 in the public mode. Moreover, for example, when an average value of time intervals for inputting characters included in the password is longer than a predetermined time period, the page generation unit 36 may generate the portal page 20 in the private mode, otherwise the page generation unit 36 may generate the portal page 22 in the public mode. Moreover, for example, when a time period from a time when the login page is displayed to the time when the first character of the password is input is longer than a predetermined time period, the page generation unit 36 may generate the portal page 20 in the private mode, otherwise the page generation unit 36 may generate the portal page 22 in the public mode. Moreover, for example, depending on whether or not an elapsed time from a time when the login page is received from the server 12 (or the time when the login page is displayed on the user terminal 14) to a time when the input of the password is complete is longer than a predetermined time period, the page generation unit 36 may determine whether to generate the portal page 20 in the private mode or the portal page 22 in the public mode. Moreover, for example, a standard value of an input time interval may be stored in advance for each user in the data storage unit 30, and depending on whether or not the average value of the time intervals for inputting the characters included in the password is longer than the above-mentioned standard value, the page generation unit 36 may determine whether to generate the portal page 20 in the private mode or the portal page 22 in the public mode.

Note that, a timing when the password or the like is input may be identified by the server 12 when, for example, the user terminal 14 transmits to the server 12 information indicating an input time and the server 12 receives the information. It is understood that, the timing when the password or the like is input may be identified by the server 12 also when the user terminal 14 transmits a notification to the server 12 every time the password is input and the server 12 treats a reception timing of the notification as the input timing of the password. Moreover, a timing when the login page is displayed may be identified by the server 12 when, for example, the server 12 treats a timing to transmit the login page to the user terminal 14 as the timing when the login page is displayed. Moreover, for example, as with a tool bar function of the web browser, a program installed in the user terminal 14 may monitor the time when the password is input or the time when the login button is clicked on, and the program may transmit information indicating those times to the server 12.

Moreover, for example, when the receiving unit 32 receives as the password a character string obtained by adding an arbitrary character or character string to the password set by the user, the authentication unit 34 may judge that the user has been successfully authenticated. Then, in this case, depending on the length of the added character or character string, the order of sequence, the position of the addition (whether the character or character string to is added at the head or tail of the password set by the user), or the like, the page generation unit 36 may determine whether to generate the portal page 20 in the private mode or the portal page 22 in the public mode.

Moreover, for example, depending on an input mode of the received password, the page generation unit 36 may generate any one of a plurality of portal pages 22 in the public mode having different criteria for narrowing down the range of the information on the basis of which the portal page is generated (criteria on what range of information is used as the basis for generating the portal page). For example, when the first password is received, the access history may be arranged but the purchase history may not be arranged in the portal page, and when the second password is received, the purchase history may be arranged but the access history may not be arranged in the portal page.

Moreover, for example, depending on the number of repetitions of a character string set in advance by the user in the character string input as the password, the page generation unit 36 may determine whether to generate the portal page 20 in the private mode or the portal page 22 in the public mode. Specifically, for example, when the receiving unit 32 receives as the password the same character string as the character string set in advance by the user, the page generation unit 36 may generate the portal page 20 in the private mode, and when the receiving unit 32 receives as the password a character string obtained by concatenating a plurality of the character strings set in advance by the user, the page generation unit 36 may generate the portal page 22 in the public mode. Moreover, the information on the basis of which the portal page is generated is not limited to the above-mentioned information, and may be, for example, a telephone number of the user, a bookmark set by the user, an electronic mail, an address book, schedule data, picture, or a program. Moreover, the information on the basis of which the portal page is generated may be information stored on the server 12 or information stored in the user terminal 14.

Moreover, the division of roles between the server 12 and the user terminal 14 is not limited to the above-mentioned embodiment. For example, the user terminal 14 may identify the control information such as the secrecy level based on the content of the operation performed in the password input field with the input device, and transmit the control information to the server 12. Then, the server 12 may identify the publicly-displayable range of the information on the user based on the control information received from the user terminal 14. Moreover, this embodiment may be applied to a server 12 that provides a service different from the shopping site. Moreover, the above-mentioned specific numerical values and character strings, and specific numerical values and character strings in the drawings are exemplary, and the present invention is not limited to those numerical values and character strings.

The invention claimed is:

1. An information processing system, comprising:
at least one processor; and
at least one memory device that stores a plurality of instructions, which when executed by the at least one processor, causes the at least one processor to operate to:
authenticate a user; and
generate a page provided to the user, wherein
the user is authenticated by using a first part of content of an operation performed in a password input field with an input device and a password set in advance by the user;
identify control information, which is information different from the password set in advance by the user and a second part of the content of the operation not used for the authentication of the user;
identify a publicly-displayable range of information on the user based on the control information; and
wherein
when the authentication of the user is succeeded, limit a range of information on the user used for generating information disposed on the page provided to the user so that the range of the information falls within the identified publicly-displayable range.

2. The information processing system according to claim 1, wherein when executed by the at least one processor, the plurality of instructions cause the at least one processor to operate to identify a first information element from among one or more information elements on the user, and
limit, to the identified first information element, the range of the information used for generating information disposed on the page provided to the user.

3. The information processing system according to claim 2, wherein to each of the one or more information elements, a secrecy level representing a degree of secrecy of the information is set,
wherein when executed by the at least one processor, the plurality of instructions cause the at least one processor to operate to identify the secrecy level, and
identify an information element having set thereto a secrecy level representing secrecy that is lower than secrecy represented by the identified secrecy level.

4. The information processing system according to claim 3, wherein the secrecy level is set based on a combination of a type of an item or service introduced in a page browsed by the user and an attribute of the user.

5. The information processing system according to claim 2, wherein when executed by the at least one processor, the plurality of instructions cause the at least one processor to operate to limit a range of information disposed on the page provided to the user.

6. The information processing system according to claim 2, wherein when a condition that a character string input to the input device includes the password set in advance by the user is satisfied, the plurality of instructions cause the at least one processor to operate to limit the range of the information used for generating information disposed on the page.

7. The information processing system according to claim 2, wherein when any one of a plurality of character strings having the same number of characters is input to the input device, the plurality of instructions cause the at least one processor to operate to limit the range of the information used for generating information disposed on the page provided to the user so that the range of the information falls within a range of information associated with the control information which is a part of the input character string and information different from the password set in advance by the user.

8. The information processing system according to claim 1, wherein when executed by the at least one processor, the plurality of instructions cause the at least one processor to operate to limit a range of information disposed on the page provided to the user.

9. The information processing system according to claim 1, wherein when executed by the at least one processor, the plurality of instructions cause the at least one processor to operate to control information disposed on the page provided to the user so that alternative information is arranged instead of information limited not to be disposed on the page.

10. The information processing system according to claim 1, wherein when a condition that a character string input to the input device includes the password set in advance by the user is satisfied, the plurality of instructions cause the at least one processor to operate to limit the range of the information used for generating information disposed on the page.

11. The information processing system according to claim 1, wherein when any one of a plurality of character strings having the same number of characters is input to the input device, the plurality of instructions cause the at least one processor to operate to limit the range of the information used for generating information disposed on the page provided to the user so that the range of the information falls within a range of information associated with the control information which is a part of the input character string and information different from the password set in advance by the user.

12. The information processing system according to claim 1, wherein when any one of a plurality of character strings having the same number of characters and at least parts of keys used to input characters at the same positions from a top of matching with each other is input to the input device, the plurality of instructions cause the at least one processor to operate to limit the range of the information on the user used for generating information disposed on the page provided to the user so that the range of the information falls within a range of information associated with the control information which is a key input to the input device and information different from the password set in advance by the user.

13. The information processing system according to claim 1, wherein when executed by the at least one processor, the plurality of instructions cause the at least one processor to operate to identify the control information based on an input interval of characters included in the password or a time period calculated based on a time when an input of the password is enabled and a time when a character included in the password is input.

14. The information processing system according to claim 1, wherein when executed by the at least one processor, the plurality of instructions cause the at least one processor to operate to identify information on the user associated with a type of an item or service or an attribute of the user as the publicly-displayable range, based on the control information.

15. An information processing method, comprising:
authenticating a user by using a first part of content of an operation performed in a password input field with an input device and a password set in advance by the user;
identifying control information, which is information different from the password set in advance by the user and a second part of the content of the operation not used for the authentication of the user;
identifying a publicly-displayable range of information on the user based on the control information; and
when the authentication of the user is succeeded, limiting a range of information on the user used for generating information disposed on the page provided to the user so that the range of the information falls within the identified publicly-displayable range.

16. An information processing device, comprising:
at least one processor; and
at least one memory device that stores a plurality of instructions, which when executed by the at least one processor, causes the at least one processor to operate to:
generate a page provided to a user,
when the user is authenticated by using a first part of content of an operation performed in a password input field with an input device and a password set in advance by the user, identify a publicly-displayable range of information on the user based on control information, which is information different from the password set in advance by the user and is identified based on a second part of the content of the operation not used for the authentication of the user; and
when the authentication of the user is succeeded, limit a range of information on the user used for generating information disposed on the page provided to the user so that the range of the information falls within the identified publicly-displayable range.

17. A non-transitory storage medium having a program stored thereon, the program causing a computer to function as:
a page generation unit that generates a page provided to a user, wherein
when the user is authenticated by using a first part of content of an operation performed in a password input field with an input device and a password set in advance by the user, the page generation unit identifies a publicly-displayable range of information on the user based on control information, which is information different from the password set in advance by the user and is identified based on a second part of the content of the operation not used for the authentication of the user; and
when the authentication of the user is succeeded, the page generation unit limits a range of information on the user used for generating information disposed on the page provided to the user so that the range of the information falls within the identified publicly-displayable range.

* * * * *